United States Patent Office 3,347,908
Patented Oct. 17, 1967

3,347,908
N-LACTOYL AND N-HALOPYRUVOYL-2-NITROANILIDES
Karl Pfister and Janos Kollonitsch, Westfield, N.J., assignors to Merck & Co., Inc., Rahway, N.J., a corporation of New Jersey
No Drawing. Original application June 24, 1963, Ser. No. 290,257. Divided and this application Oct. 31, 1966, Ser. No. 590,477
7 Claims. (Cl. 260—488)

ABSTRACT OF THE DISCLOSURE

Novel N-(halopyruvoyl)-2-nitroanilides having the structure:

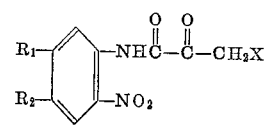

where $R_1$ and $R_2$ are hydrogen, lower alkyl, lower alkoxy, or trifluoromethyl groups and X is chlorine or bromine are prepared by condensation of an o-nitroaniline with a lactic acid or acid halide to form a N-lactoyl-2-nitroanilide. The α-hydroxy group of the latter compound is then oxidized to a keto group so as to produce the corresponding pyruvoyl compound, which is then halogenated. In the alternative, the o-nitroaniline compound may be condensed with an α-alkanoyloxy acrylic acid or acid halide to produce the N-(α-alkanoyloxy acryloyl)-2-nitroanilide. The latter compound is halogenated to the α,β-dihalide which is then treated with an alcohol to give the N-(halopyruvoyl)-2-nitroanilide. The novel compounds are converted into 2-(4′-thiazolyl)-2-nitroanilines which are useful anthelmintics.

---

This is a division of application Ser. No. 290,257, filed June 24, 1963, now abandoned.

This invention relates to novel N-(substituted)-2-nitroanilides. More specifically, it relates to novel N-(substituted)-2-nitroanilides which may be converted into N-(4′-carbothiazolyl)-2-nitroanilides, which may in turn be converted into 2-(4′-thiazolyl)-benzimidazoles. Specifically, it relates to novel N-(halopyruvoyl)-2-nitroanilides, novel processes for obtaining them, novel intermediates obtained thereby, and a novel process for converting them into N-(4′-carbothiazolyl)-2-nitroanilides.

It has recently been discovered that certain benzimidazoles substituted in the 2 position with a 4′-thiazolyl radical possess anthelmintic properties. The discovery that such compounds are effective anthelmintics has prompted an increasing amount of research directed toward providing new processes for obtaining such compounds.

It is an object of the present invention to provide N-(4′-carbothiazolyl)-2-nitroanilides which may be easily converted into 2-(4′-thiazolyl)benzimidazoles.

It is a further object of this invention to provide novel N-(halopyruvoyl)-2-nitroanilides which may be converted into N-(4′-carbothiazolyl)-2-nitroanilides.

It is another object of the invention to provide novel N-(substituted)-2-nitroanilides which may be converted to N-(halopyruvoyl)-2-nitroanilides.

Another object is to provide novel processes for preparing N-(halopyruvoyl)-2-nitroanilides.

Yet another object is to provide a novel process for preparing N-(4′-carbothiazolyl)-2-nitroanilides.

These and other objects will become more apparent when consideration is given to the following detailed disclosure.

The novel end compounds encompassed within the present invention, which may be subsequently converted into 2-(4′-thiazolyl)benzimidazoles by way of N-(4′-carbothiazolyl)-2-nitroanilides, are N-(halopyruvoyl)-2-nitroanilides depicted structurally as follows:

$$R_1-\phantom{x}\text{—NHC(=O)—C(=O)—CH}_2X$$
$$R_2-\phantom{x}\text{—NO}_2$$

III where X is a halogen atom such as chlorine and bromine, $R_1$ and $R_2$ are selected from the group consisting of hydrogen, lower alkyl, such as methyl, ethyl, propyl and butyl, lower alkoxy such as methoxy, ethoxy, propoxy, and butoxy, and trifluoromethyl groups. The compounds which may be prepared include N-(bromopyruvoyl)-2-nitroanilide, N-(chloropyruvoyl)-2-nitroanilide, N-(bromopyruvoyl)-2-nitro-4-trifluoromethylanilide, N-(chloropyruvoyl)-2-nitro-4-methylanilide, N-(bromopyruvoyl)-2-nitro-4-methylanilide, N-(bromopyruvoyl)-2-nitro-4,5-dimethylanilide, and the like. Also within the scope of the invention are novel intermediate compounds obtained as a result of preparing Compounds III.

According to one aspect of the invention, Compounds III are prepared by effecting the condensation of an o-nitroaniline with lactic acid, a lactoyl halide or an O-alkanoylated derivative of either of these, to form an N-(lactoyl)-2-nitroanilide. When the lactic acid starting material is either the free acid or the acid halide, the resulting amide will have a free α-hydroxyl group on the lactoyl moiety. This hydroxyl group is then oxidized to the keto group in accordance with the second step of the process. Where, however, the hydrogen atom of the α-hydroxyl group of the lactic acid starting material is replaced by an alkanoyl group, the corresponding N-(O-alkanoyl lactoyl)-2-nitroanilide will be obtained as a result of the amidation. The O-alkanoyl group is removed as hereafter specified to obtain the free α-hydroxyl group prior to the oxidation step above referred to. This oxidation step involves using an oxidizing system capable of converting the hydroxyl group of the lactoyl moiety to the keto group, thereby converting the lactoyl substituent to a pyruvoyl substituent. The pyruvoyl compound is then halogenated to produce the novel N-(halopyruvoyl)-2-nitroanilides previously designated as Compounds III and appearing as such in the flow diagram hereinbelow. The resulting N-(halopyruvoyl)-2-nitroanilide is then reacted with a thioformamide to effect the formation of the thiazolyl radical, with the 2 and 3 carbon atoms of the pyruvoyl moiety forming the 4 and 5 positions of the thiazolyl group. The resulting compounds, N-(4′-carbothiazolyl)-2-nitroanilides, are indicated as Compounds IV in the following flow diagram which depicts the presently described overall process:

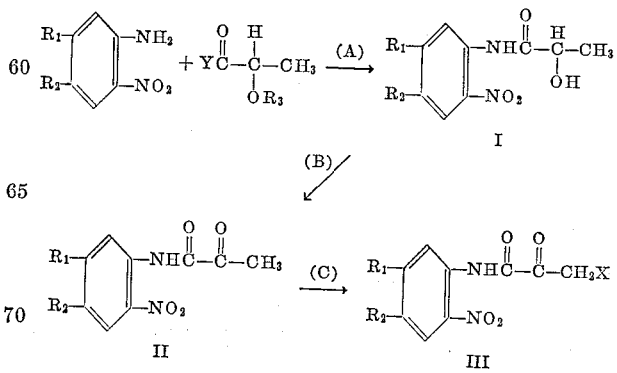

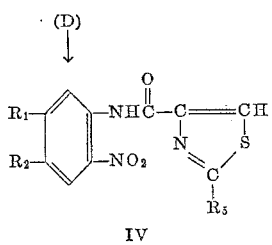

where $R_1$, $R_2$ and X are as previously defined, $R_3$ is a hydrogen atom or a lower alkanoyl group such as acetyl, propionyl, or butyryl, and Y is OH or a halogen atom such as chlorine or bromine, and $R_5$ is hydrogen or lower alkyl.

According to the first step of the process, Step A, the amidation is effected between lactic acid or its defined derivatives with a o-nitroaniline. The amounts of each reagent are not critical but it is preferred to use a slight excess of the o-nitroaniline compound. Where at least one of the reagents is a liquid, the reaction is effectively carried out without the aid of a solvent. Preferred reactants in this regard are lactic acid and o-nitroaniline. Where both of the reactants are solid, it is preferred to use a solvent to aid in the reaction process. Any suitable inert solvent may be employed. For example, aromatic solvents such as benzene, toluene, xylene and the like; aliphatic hydrocarbons such as hexane, heptane and the like; acetone, ether, methyl isobutyl ketone and the like; may be used. The temperature of the reaction is not critical but elevated temperatures are preferred. Temperatures approaching the decomposition point of any of the reactants should of course be avoided. In this regard, the reaction is preferably carried out at the reflux temperature of the system irrespective of whether solvents are employed or not. Suitable results, however, are obtained at temperatures ranging from room temperature up to about 200° C. It is also desirable to run the reaction under a stream of inert gas to remove the water formed as a result of the free acid reaction (when Y=OH), with the amino group. When $R_3$ is hydrogen in the above formula, there are obtained, as a result of this reaction step, novel N-(lactoyl)-o-nitroanilides, Compounds I, which form as a precipitate in the reaction mass. Representative of such compounds are N-(lactoyl)-2-nitroanilide, N-(lactoyl)-2-nitro-4-methylanilide, N-(lactoyl)-2-nitro-4-methoxy-anilide, N-(lactoyl)-2-nitro-4,5-dimethylanilide, N-(lactoyl)-2-nitro-4-trifluoromethylanilide and the like. The product may be filtered, washed and dried in accordance with known techniques to obtain the purified product.

When $R_3$ is alkanoyl in the above flow diagram, Step A above results in the formation of the corresponding novel N-(O-alkanoyl lactoyl)-2-nitroanilides. In order to obtain Compounds I therefrom, Step A requires an additional operation. This involves the treatment of the formed O-alkanoyl compound with a suitable base to de-alkanoylate the anilide. This is preferably done with aqueous sodium hydroxide, potassium hydroxide, ammonium hydroxide and the like and preferably in equimolar amounts and at room temperature. Suitable results are obtained when temperatures in the range of from about 20° C. to about 80° C. are employed. Representative of those lactic acid starting materials where $R_3$ is alkanoyl are α-acetoxy propionic acid, α-acetoxy propionyl chloride, α-acetoxy propionyl bromide, α-propionyloxy propionic acid, α-propionyloxy propionyl chloride and the like.

Step B of the process, the oxidation step, contemplates oxidizing the α-hydroxyl group of the lactoyl moiety of Compounds I with a suitable oxidizing agent. Suitable oxidizing agents are permanganate, dichromate, an Oppenauer system comprising an aluminum alkoxide, such as aluminum isopropoxide in combination with a ketone such as acetone, cyclohexanone and the like. The preferred oxidizing system is dichromate in the presence of hydronium ions. It is preferred to use the calculated number of equivalents of dichromate and Compound I, with enough acid to supply the correspondingly required amount of hydronium ions for oxidizing the hydroxyl group to the keto group. These calculations may be made by one skilled in the art. The dichromate may be supplied in the form of an alkali metal dichromate such as sodium or potassium dichromate with sodium dichromate being preferred. The acid supplied may be any acid such as sulfuric, phosphoric, acetic and the like with sulfuric acid being preferred. The reaction is preferably carried out in the presence of an inert solvent. Solvents such as ketones, for example, acetone, methyl ethyl ketone, cyclohexanone; halogenated hydrocarbons and mixtures thereof such as methylene chloride, chloroform, carbon tetrachloride, dichloroethane and the like; ethers such as diethyl ether, glycol dimethyl ether and the like may be employed. The temperature of the reaction is not critical, suitable results being obtained between 0° C. and 50° C. with room temperature being preferred. As a result of this step, Compounds II, N-(pyruvoyl)-2-nitroanilides, are obtained as a precipitate. Representative of such compounds are N-(pyruvoyl)-2-nitroanilide, N-(pyruvoyl)-2-nitro-4-methylanilide, N-(pyruvoyl)-2-nitro-4,5-dimethylanilide, N-(pyruvoyl)-2-nitro-4-methoxyanilide, N-(pyruvoyl)-2-nitro-4-trifluoromethylanilide and the like. They may be filtered and washed in any convenient manner.

Alternatively, Compounds II may be obtained directly from the starting materials, obviating Step B, by using pyruvic acid or a pyruvoyl halide in place of the lactic acid starting compound. Suitable conditions for the reaction are reacted in connection with Step A.

Step C of the process involves the halogenation of the N-(pyruvoyl)-2-nitroanilide to obtain Compounds III. The bromo compound is preferred and bromination is therefore the preferred process step. The halogenation is preferably carried out by dissolving the N-(pyruvoyl)-2-nitroanilide in a suitable inert halogenation solvent. Such solvents as halogenated aliphatic solvents such as chloroform, methylene chloride, carbon tetrachloride, dichloroethane; acetic acid, benzene and the like may be employed. The halogenating agent which may be liquid bromine, gaseous chlorine, N - bromosuccinimide, N-chlorosuccinimide and the like, is then introduced into the system and the halogenation effected at elevated temperatures. The temperature is not critical and is advantageously set at about the reflux temperature of the particular system used. This temperature will depend upon the solvents and halogenating agents employed but in general, temperatures in the range of from 80 to 100° C. are suitable. The products, N-(halopyruvoyl)-2-nitroanilide, Compounds III, are obtained as a precipitate in the reaction mass. Typical of these compounds are N-(bromopyruvoyl) - 2 - nitroanilide, N-(chloropyruvoyl)-2-nitroanilide, N - (bromopyruvoyl)-2-nitro-4-methylanilide, N-(chloropyruvoyl)-2-nitro-4-methylanilide, N - (bromopyruvoyl)-2-nitro-4,5-dimethylanilide, N-(chloropyruvoyl)-2-nitro-4,5-dimethylanilide, N - (bromopyruvoyl)-2-nitro-4 - trifluoromethylanilide, N - (bromopyruvoyl)-2-nitro-4-methoxyanilide, N - (chloropyruvoyl)-2-nitro-4-trifluoromethylanilide and the like. They may then be washed and dried using inert solvents such as above mentioned and recrystallized from them.

Step D of the process involves the conversion of Compounds III into N-(4'-carbothiazolyl) - 2 - nitroanilides, Compounds IV, by reacting a thioformamide with the N-(halopyruvoyl)-2-nitroanilide obtained from Step C. A thioformamide or a combination of thioformamide generating reactants such as formamide and phosphorus pentasulfide may be employed. The term "A thioformamide" is meant to include compounds of the formula

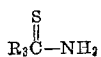

where $R_5$ is hydrogen or lower alkyl. When $R_5$ is lower alkyl, as for example, thioacetamide, thiopropionamide and the like, the resulting N-(4'-carbothiazolyl)-2-nitroanilides will be additionally substituted at the 2' position of the thiazolyl radical with methyl, ethyl and the like. The reaction between the thioformamide and Compounds III is effective to form the thiazolyl radical utilizing the sulfur and nitrogen atoms of the thioformamide as the 1 and 3 hetero atoms and the 2 and 3 carbon atoms of the pyruvoyl moiety as the 4 and 5 carbon atoms of the heterocyclic ring. The reaction is preferably carried out in a suitable inert solvent. As representative of such solvents there may be mentioned acetone, methyl ethyl ketone, tetrahydrofuran, acetonitrile, dimethylether, dimethyl formamide and the like. The reaction is preferably run at between 50° and 100° C. although the actual temperature is not critical and temperatures outside this range may be employed. Under such conditions, the reaction is normally complete in from 2–10 hours. As a result of this step of the process, Compounds IV are obtained in solution and may be recovered therefrom by cooling the reaction mass to a temperature somewhat below room temperature. Temperatures of the order of 0–5° C. are suitable for this purpose. For example, the reaction mass may be cooled on ice and the resulting crystals obtained thereby may be filtered and washed with ether and dried. Typical of the compounds obtained are N-(4'-carbothiazolyl)-2-nitroanilide, N - (4'-carbothiazolyl)-2-nitro-4-methylanilide, N - (4' - carbothiazolyl)-2-nitro-4,5-dimethylanilide, N - (4'-carbothiazolyl)-2-nitro-4-trifluoromethylanilide.

Compounds IV are converted to 2-(4'-thiazolyl)benzimidazoles in accordance with the procedure exemplified by Example 9 appearing hereinafter.

In accordance with another aspect of this invention, Compounds III are prepared by a process depicted structurally as follows:

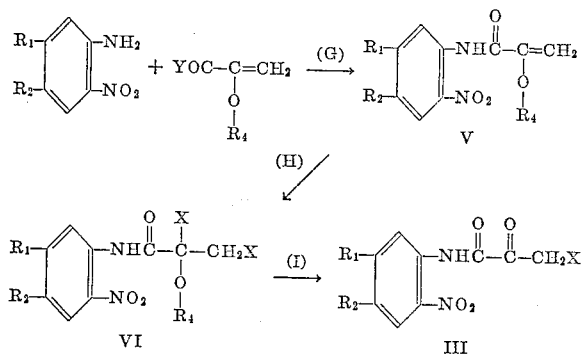

where Y is OH or a halogen atom such as chlorine or bromine and $R_4$ is a lower alkanoyl radical such as acetyl, propionyl, butyryl, and the like.

According to the procedure represented by the foregoing flow diagram, α-alkanoyloxy acrylic acids or acid halides thereof are reacted with the o-nitroaniline in Step G to produce N-(α-alkanoyloxy acryloyl)-2-nitroanilides (Compounds V) under the same conditions as recited in connection with Step A. These are then halogenated in Step H to obtain the α,β dihalides N-(α,β-dihalo-α-alkanoyloxy propionyl)-2-nitroanilides (Compound VI), using the general conditions recited in connection with Step C with proper adjustment in the amount of halogenating agent in view of the requirement for two halogen atoms per mole of Compound V.

The conversion of the dihalide to Compounds III is effected by treatment of the dihalide with a suitable alcohol such as methanol, ethanol, propanol and the like with methanol being preferred, preferably in large excess amounts of alcohol. The reaction is carried out advantageously at from 0° C. to 50° C. Compounds III may then be recovered as recited in connection with Step G above.

Representative of Compounds V are N-(α-acetoxy acryloyl)-2-nitroanilide, N-(α-propionyloxy acryloyl) - 2-nitroanilide, N-(α-ocetoxy acryloyl)-2 - nitro - 4 - methylanilide, N-(α-propionyloxy acryloyl)-2-nitro - 4 - methylanilide, N-(α-acetoxy acryloyl) - 2 - nitro - 4,5 - dimethylanilide and the like.

Typical of Compounds VI are

N-(α,β-dibromo, α-acetoxy propionyl)-2-nitroanilide,
N-(α,β-dichloro, α-acetoxy propionyl)-2-nitroanilide,
N-(α,β-dichloro, α-propionyloxy propionyl)-2 - nitroanilide,
N-(α,β-dichloro, α-acetoxy propionyl)-2-nitro-4-methoxyanilide,
N-(α,β-dibromo, α-propionyloxy propionyl)-2-nitroanilide,
N-(α,β-dibromo, α-acetoxy propionyl)-2-nitro-4 - methylanilide,
N-(α,β-dibromo, α-propionyloxy propionyl)-2-nitro-4,5-dimethylanilide,
N-(α,β-dibromo, α-propionyloxy propionyl-2-nitro-4 - trifluoromethylanilide,
and the like.

The following examples are given for the purposes of illustration and not by way of limitation:

EXAMPLE 1

*N-(lactoyl)-2-nitroanilide*

A mixture of 69 g. of o-nitroaniline and 50 g. of lactic acid is heated for 65 hours at 155°, while a slow stream of nitrogen is kept streaming through the reaction mass to carry off the water formed. The total reaction mass is next added to 300 ml. of saturated sodium hydrocarbonate and stirred for 2 hours, the solid product filtered, washed with water, dissolved in 300 ml. of chloroform, washed with sodium hydrocarbonate solution and with water, and then dried over magnesium sulfate, and the solution evaporated to dryness.

When the foregoing procedure is repeated using equivalent amounts of 2-nitro-4-methylaniline, 2-nitro-4,5-dimethyl aniline, 2-nitro-4-trifluoromethyl aniline, or 2-nitro-4-methoxy aniline, in place of o-nitroaniline, the corresponding N-(lactoyl)-2-nitro-4 - methylanilide, N - (lactoyl)-2-nitro-4-trifluoromethylanilide, or N - (lactoyl) - 2-nitro-4-methoxyanilide are obtained.

EXAMPLE 2

*N-(pyruvoyl)-2-nitroanilide*

40 g. of crude N-(lactoyl)-2-nitroanilide prepared in Example 1 is dissolved in 400 ml. of acetone, and the resulting mass filtered free of insolubles. A solution made of 50 g. of sodium dichromate, 112 g. of concentrated sulfuric acid and 185 ml. of water is dropped into the acetone solution rapidly at between 10°–20° C. After stirring at room temperature overnight, it is concentrated in vacuo and the product filtered. It is triturated with acetone, filtered from the insoluble, and water is then added till it becomes cloudy. After concentrating it in vacuo to half volume, yellow crystals separate: M.P.: 84–85° C.

Similar results are obtained when the above procedure is repeated substituting equivalent amounts of potassium permanganate for sodium dichromate.

When the foregoing procedure is repeated, replacing the N-(lactoyl) - 2 - nitroanilide with equivalent amounts of N-(lactoyl)-2-nitro-4-methylanilide, N-(lactoyl)-2 - nitro-4,5-dimethylanilide, or N-(lactoyl)-2 - nitro - 4 - trifluoromethylanilide, the corresponding N-(pyruvoyl)-2-nitro-4-methylanilide, N-(pyruvoyl)-2-nitro-4,5 - dimethylanilide or N-(pyruvoyl)-2-nitro - 4 - trifluoromethylanilide is obtained.

EXAMPLE 3

*N-(bromopyruvoyl)-2-nitroanilide*

24 g. of N-(pyruvoyl)-2-nitroanilide prepared in Example 2 is dissolved in 250 ml. of carbon tetrachloride.

To this is added 19 g. of bromine and the resulting solution heated overnight at 80–85° C. under a reflux condenser. After cooling it to room temperature, the product N-(bromopyruvoyl)-2-nitroanilide crystallizes and is filtered; M.P. 97–99° C.

*Analysis.*—Calcd. C, 37.7%; H, 2.45%; N, 9.75%; Br, 27.9%. Found: C, 37.54%; H, 2.18%; N, 9.28%; Br, 29.07%.

In a similar manner, N-(chloropyruvoyl)-2-nitroanilide is prepared by passing gaseous chlorine into the solution of N-(pyruvoyl)-2-nitroanilide for about 2 hours at a temperature of about 50° C.

Similarly N-(bromopyruvoyl)-2-nitro-4 - methylanilide is obtained when equivalent amounts of 2-nitro-4-methylaniline are substituted for o-nitroaniline in the above procedure.

EXAMPLE 4

*N-(4'-carbothiazolyl)-2-nitroanilide*

0.574 g. of N-(bromopyruvoyl)-2-nitroanilide prepared in Example 3, and 0.122 g. of thioformamide hydrate are refluxed in 15 ml. of acetone overnight. The reaction mass is filtered from a small amount of solid, and the filtrate freed of acetone by evaporation. The residue is dissolved in ethanol 2B, treated with activated charcoal and cooled on ice. The product crystallizes, is filtered, and washed with ether. M.P. 145–146° C.

N-(2'-methyl - 4' - carbothiazolyl) - 2 - nitroanilide and N-(2'-ethyl-4'-carbothiazolyl)-2-nitroanilide are obtained when thioformamide is replaced in the foregoing procedure with equivalent amounts of thioacetamide and thiopropionamide respectively.

EXAMPLE 5

*N-(O-acetyl lactoyl)-2-nitroanilide*

A solution of 6 g. of α-acetoxy-propionyl chloride in 25 ml. of ether, is added to a solution of 11 g. of o-nitroaniline in 75 ml. of ether, then it is left standing at room temperature for 3 days. It is filtered, the filtrate concentrated in vacuo, the residue taken up in chloroform and filtered again. Hydrogen chloride gas is passed into it for a few minutes, and the mixture filtered again. The filtrate is concentrated in vacuo yielding the product N-(O-acetyl lactoyl)-2-nitroanilide.

EXAMPLE 6

*Saponification of N-(O-acetyl lactoyl)-2-nitroanilide*

5.1 g. of N-(O-acetyl lactoyl)-2-nitroanilide is dissolved in 25 ml. of acetone. A solution of 1 g. of sodium hydroxide in 10 ml. water is then added and the mixture stirred for 2 hours at room temperature. After removal of the acetone by distillation in vacuo, the residue is extracted with 3×25 ml. of ether, washed with water, dried over MgSO₄ and evaporated to dryness. 3.8 g. of orange colored crystals of N-(lactoyl)-2-nitroanilide are obtained.

EXAMPLE 7

*N-(α-acetoxy acryloyl)-2-nitroanilide*

A solution of 4.5 g. of α-acetoxy-acryloyl chloride in 30 ml. of ether is added to a stirred solution of 8.25 g. of o-nitroaniline in 60 ml. of ether with simultaneous ice cooling. After 1 hour in the ice bath, it is stirred for 1 additional hour at room temperature, filtered, and the filtrate evaporated to a solid which is then eluted with chloroform. The chloroform solution is concentrated to an oil and this is recrystallized from ether-petroleum ether, then from benzene-ether yielding N-(α-acetoxyacryloyl)-2-nitroanilide, M.P. 80–81° C.

*Analysis.*—Calcd. C, 52.8%; H, 4.0%; N, 11.2%. Found: C, 52.7%; H, 4.1%; N, 11.1%.

N-(α-propionyloxy acryloyl)-2-nitroanilide is obtained when the foregoing procedure is repeated using equivalent amounts of α-propionyloxy acryloyl chloride in place of α-acetoxy acryloyl chloride.

EXAMPLE 8

*N-(bromopyruvoyl)-2-nitroanilide*

To a suspension of 2.4 g. of N-(α-acetoxy acryloyl)-2-nitroanilide in 20 ml. of carbon tetrachloride, a solution of 1.57 g. of bromine in 5 ml. carbon tetrachloride is added during 1 hour at room temperature, and the resulting mixture stirred for 4 hours more yielding N-(α,β-dibromo-α-acetoxy propionyl)-2-nitroanilide. 30 ml. of methanol is then added and the mixture stirred overnight, concentrated in vacuo at room temperature, and the residue flashed with ether leaving 3.88 g. of an orange oil, which solidifies on standing. The reaction mass is filtered with ether, then stirred with sodium hydrocarbonate solution for about 30 minutes, washed with water, dried over MgSO₄ and evaporated to dryness in vacuo to yield the product N-(bromopyruvoyl)-2 - nitroanilide. A sample of it, dissolved in acetone, on addition of pyridine gives the pyridinium salt, melting point 231–2°/dec.

When the above procedure is repeated using equivalent amounts of gaseous chlorine in place of bromine, the halogenation results in N-(α,β-dichloro-α-acetoxy propionyl)-2-nitroanilide which is then converted to N-(chloropyruvoyl)-2-nitroanilide by treatment with methanol as above described.

EXAMPLE 9

*Conversion of N-(4'-carbothiazolyl)-2-nitroanilides into 2(4'-thiazolyl)benzimidazoles*

18 grams of N-(4'-carbothiazoyl)-2-nitroanilide is suspended in 150 mls. of glacial acetic acid and 80 mls. of 6 N hydrochloric acid added thereto. 60 g. of zinc dust is added in small portions to the acetic mixture. After the zinc addition is complete, and the reaction is essentially finished (by visual observation), the reaction mixture is filtered and the filtrate neutralized with concentrated ammonium hydroxide to precipitate 2(4'-thiazolyl) benzimidazole. The product is purified by recrystallization from ethyl acetate.

Any departure from the above description which conforms to the present invention is intended to be included within the scope of the claims.

What is claimed is:

1. A compound of the formula:

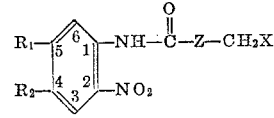

where $R_1$ and $R_2$ are each hydrogen, lower alkyl, lower alkoxy or the trifluoromethyl group, Z is

or

where $R_4$ is lower alkanoyl, $X_1$ is chloro or bromo and X is hydrogen, chloro or bromo.

2. The compound of claim 1 wherein $R_1$ and $R_2$ are hydrogen, X is bromo and Z is

3. The compound of claim 1 wherein $R_1$ and $R_2$ are hydrogen, X is chloro and Z is

4. The compound of claim 1 wherein $R_1$ is hydrogen, $R_2$ is methyl, X is bromo and Z is

5. The compound of claim 1 wherein $R_1$, $R_2$ and X are hydrogen and Z is

6. The compound of claim 1 wherein $R_1$ and $R_2$ are hydrogen, Z is

X and $X_1$ are bromo and $R_4$ is acetyl.

7. The compound of claim 1 wherein $R_1$ and $R_2$ are hydrogen, Z is

X and $X_1$ are chloro and $R_4$ is acetyl.

References Cited

UNITED STATES PATENTS

| | | | |
|---|---|---|---|
| 2,995,605 | 8/1961 | Siegrist et al. | 260—562 |
| 3,017,415 | 1/1962 | Sarett et al. | 260—302 |
| 3,080,282 | 3/1963 | Shunk | 167—55 |
| 3,102,074 | 8/1963 | Brown | 167—55 |

OTHER REFERENCES

Brand et al.: Chem. Abst., vol. 47, cols. 3257-8 (1953).

Brown et al.: Jour. Amer. Chem. Soc., vol. 83, pp. 1764-5 (1961).

Cornforth Organic Syn., vol. 31, pp. 59-62, N.Y., Wiley (1951).

Elb.: Chem. Abst., vol. 5, pp. 2073-4 (1911).

Fenton et al.: Jour. Chem. Soc. (Lon.), vol. 77, pp. 70-71 relied on (1900).

Migridichian Org. Syn., vol. 1, pp. 299-300 relied on, N.Y., Reinhold (1957).

Noller: Chem. of Org. Compounds, 2nd ed., pp. 106, 214 and 244, Phila., Saunders (1958).

Rappen: Chem. Abst., vol. 35, cols. 3964-5 (1941).

Rodd: Chem. of Carbon Compounds, vol. I, part B, p. 860, N.Y., Elsevier (1952).

Shapiro et al.: Jour. Amer. Chem. Soc., vol. 81, pp. 6322-9 (1959)

WALTER A. MODANCE, *Primary Examiner.*

N. TROUSOF, *Assistant Examiner.*